(12) United States Patent
Heo et al.

(10) Patent No.: US 11,500,422 B2
(45) Date of Patent: Nov. 15, 2022

(54) WINDOW AND DISPLAY DEVICE COMPRISING THE SAME

(71) Applicant: Samsung Display Co., Ltd., Yongin-si (KR)

(72) Inventors: Jinnyoung Heo, Yongin-si (KR); Kilsung Lee, Gwacheon-si (KR); Hoseok Sohn, Seoul (KR); Yongseok Lee, Suwon-si (KR); Dong Woon Lee, Yongin-si (KR); Yusik Jeon, Hwaseong-si (KR); Beomgyu Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 128 days.

(21) Appl. No.: 16/437,937

(22) Filed: Jun. 11, 2019

(65) Prior Publication Data

US 2019/0377386 A1 Dec. 12, 2019

Related U.S. Application Data

(60) Provisional application No. 62/683,773, filed on Jun. 12, 2018.

(30) Foreign Application Priority Data

Jul. 3, 2018 (KR) ........................ 10-2018-0077218

(51) Int. Cl.
*B32B 3/02* (2006.01)
*G06F 1/16* (2006.01)
(Continued)

(52) U.S. Cl.
CPC .............. *G06F 1/1652* (2013.01); *B32B 3/02* (2013.01); *B32B 3/30* (2013.01); *B32B 17/06* (2013.01);
(Continued)

(58) Field of Classification Search
CPC .... G06F 1/1652; G06F 1/1626; G06F 1/1656; H04M 1/0266; H04M 1/0268;
(Continued)

(56) References Cited

U.S. PATENT DOCUMENTS 6,790,532 B1 * 9/2004 Gier ..................... C09D 183/14
528/425
6,815,070 B1 * 11/2004 Burkle .................... C03C 17/30
427/166
(Continued)

FOREIGN PATENT DOCUMENTS

CN 105843434 8/2016
CN 106816098 6/2017
(Continued)

OTHER PUBLICATIONS

Data sheet from Gelest on 68037-74-1 (Year: 2021).*
(Continued)

*Primary Examiner* — Z. Jim Yang
(74) *Attorney, Agent, or Firm* — H.C. Park & Associates, PLC

(57) ABSTRACT

A window for a display device that includes: a base substrate; a first coating layer disposed on a first surface of the base substrate; and a second coating layer disposed on a second surface that overlaps the first surface of the base substrate, wherein the base substrate further includes a vertical surface perpendicular to the first surface and the second surface, and the first coating layer overlaps the vertical surface. The impact resistance of the window is improved through the first coating layer covering the rear surface and the vertical surface of the base substrate.

22 Claims, 16 Drawing Sheets

(51) Int. Cl.
*C03C 17/34* (2006.01)
*B32B 17/06* (2006.01)
*B32B 3/30* (2006.01)
*G02F 1/1333* (2006.01)
*B32B 17/10* (2006.01)
*C09D 161/28* (2006.01)
*C09D 183/04* (2006.01)

(52) U.S. Cl.
CPC .... *B32B 17/10155* (2013.01); *C03C 17/3405* (2013.01); *G02F 1/133302* (2021.01); *C09D 161/28* (2013.01); *C09D 183/04* (2013.01); *Y10T 428/24364* (2015.01); *Y10T 428/24529* (2015.01); *Y10T 428/24612* (2015.01); *Y10T 428/24777* (2015.01)

(58) Field of Classification Search
CPC ......... G02F 2203/04102; G02F 1/1333; G02F 1/133302; G02F 1/133305; G09F 9/301; H01L 51/0097; B32B 3/02; B32B 3/04; C03C 17/28–328
See application file for complete search history.

(56) References Cited

U.S. PATENT DOCUMENTS

| | | | |
|---|---|---|---|
| 10,274,658 B2 | 4/2019 | Kim et al. | |
| 10,522,060 B2 | 12/2019 | Park et al. | |
| 2002/0026881 A1* | 3/2002 | Ludwig | C09D 183/04 106/900 |
| 2010/0285260 A1* | 11/2010 | Bookbinder | B32B 17/10 428/45 |
| 2012/0118628 A1* | 5/2012 | Pakula | H04M 1/0266 156/242 |
| 2012/0281383 A1* | 11/2012 | Hwang | G02B 30/25 361/807 |
| 2012/0327567 A1* | 12/2012 | Shedletsky | H05K 5/0017 361/679.01 |
| 2013/0130002 A1 | 5/2013 | Lee et al. | |
| 2013/0288010 A1* | 10/2013 | Akarapu | B24B 9/10 428/157 |
| 2013/0316133 A1* | 11/2013 | Kim | G06F 1/1656 428/137 |
| 2014/0133033 A1 | 5/2014 | Shim et al. | |
| 2014/0202916 A1* | 7/2014 | Kanda | A45C 11/00 206/524.3 |
| 2014/0234579 A1* | 8/2014 | Wang | B29C 48/12 428/141 |
| 2014/0353874 A1 | 12/2014 | Han | |
| 2016/0095241 A1* | 3/2016 | Probst | H04M 1/0266 156/60 |
| 2016/0115309 A1 | 4/2016 | Kang et al. | |
| 2016/0221294 A1 | 8/2016 | Choi et al. | |
| 2016/0227653 A1* | 8/2016 | Kim | G06F 1/1684 |
| 2016/0369131 A1 | 12/2016 | Lim et al. | |
| 2017/0101340 A1* | 4/2017 | Inoue | C09J 201/00 |
| 2017/0136734 A1* | 5/2017 | Kobune | B32B 17/00 |
| 2017/0156227 A1 | 6/2017 | Heo et al. | |
| 2017/0197875 A1* | 7/2017 | Fujii | G02B 27/0006 |
| 2017/0251086 A1* | 8/2017 | Gagne-Keats | G02F 1/133308 |
| 2017/0341451 A1* | 11/2017 | Minamidate | B32B 17/10458 |
| 2018/0001347 A1* | 1/2018 | Cho | B05D 3/06 |
| 2018/0072914 A1 | 3/2018 | Kim et al. | |
| 2018/0136367 A1* | 5/2018 | Fujii | C23C 14/34 |
| 2018/0162771 A1* | 6/2018 | Fujii | C03C 3/085 |
| 2018/0354846 A1* | 12/2018 | Koep | C09D 5/025 |
| 2019/0134940 A1* | 5/2019 | Inoue | G02F 1/1333 |
| 2019/0194066 A1* | 6/2019 | Omote | B32B 17/10 |
| 2019/0227212 A1 | 7/2019 | Kim et al. | |
| 2019/0308904 A1* | 10/2019 | Koep | C03C 17/008 |
| 2019/0324177 A1* | 10/2019 | Ikeda | G02B 5/208 |
| 2020/0110447 A1* | 4/2020 | Wu | B32B 27/40 |
| 2020/0165162 A1* | 5/2020 | Bellman | G02B 1/14 |
| 2020/0189970 A1* | 6/2020 | Bookbinder | C03C 10/0045 |
| 2020/0369560 A1* | 11/2020 | Takeda | C03C 3/097 |
| 2021/0001618 A1* | 1/2021 | Ikeyama | G03F 7/004 |

FOREIGN PATENT DOCUMENTS

| | | | | |
|---|---|---|---|---|
| CN | 107886847 | | 4/2018 | |
| EP | 3024203 A1 | * | 5/2016 | ........... G06F 1/1656 |
| JP | 2019029845 A | * | 2/2019 | ............. B41M 1/06 |
| KR | 10-0551135 | | 2/2006 | |
| KR | 10-2013-0055311 | | 5/2013 | |
| KR | 10-2013-0072630 | | 7/2013 | |
| KR | 10-2013-0117464 | | 10/2013 | |
| KR | 10-1501682 | | 3/2015 | |
| KR | 10-2016-0095250 | | 8/2016 | |
| KR | 10-1686705 | | 12/2016 | |
| KR | 10-2017-0000031 | | 1/2017 | |
| KR | 10-2017-0122932 | | 11/2017 | |
| KR | 10-1843282 | | 3/2018 | |
| WO | 2012-061435 | | 5/2012 | |
| WO | 2012-177563 | | 12/2012 | |
| WO | WO-2013089178 A1 | * | 6/2013 | ............. C03C 17/32 |

OTHER PUBLICATIONS

Record on 68037-74-1 from Chemical Book (Year: 2021).*
Definition of "overlap" from American Heritage Dictionary.*
European Search Report dated Nov. 7, 2019, issued in European Patent Application No. 19179626.7.
Office Action dated Sep. 10, 2020 in Korean Patent Application No. 10-2018-0079033.
Office Action dated Jun. 30, 2022 from the Chinese Patent Office for Chinese Patent Application No. 201810736591.7.

* cited by examiner

FIG. 1A
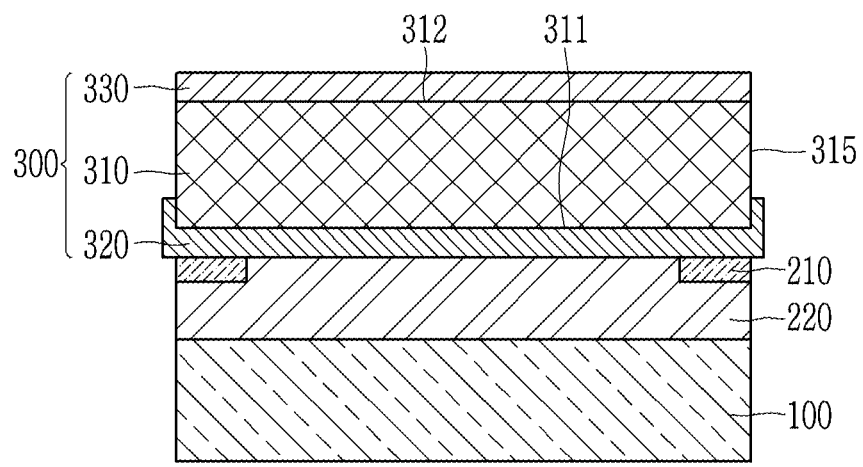
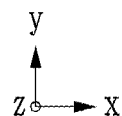
FIG. 1B
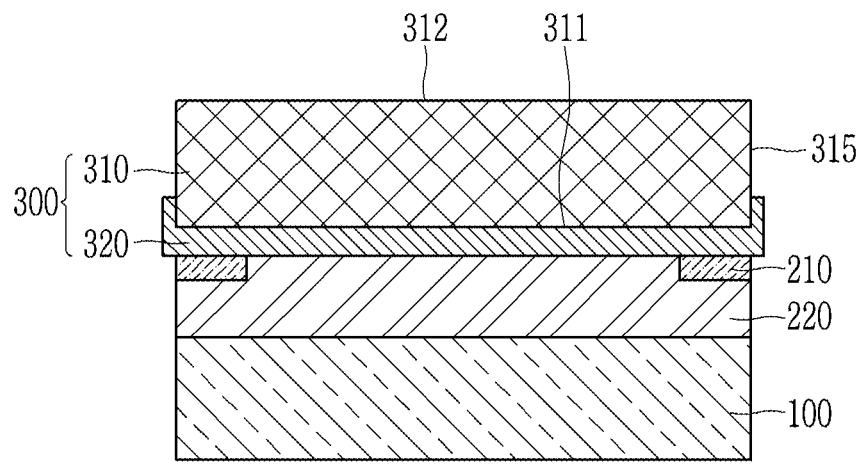
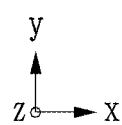

FIG. 3
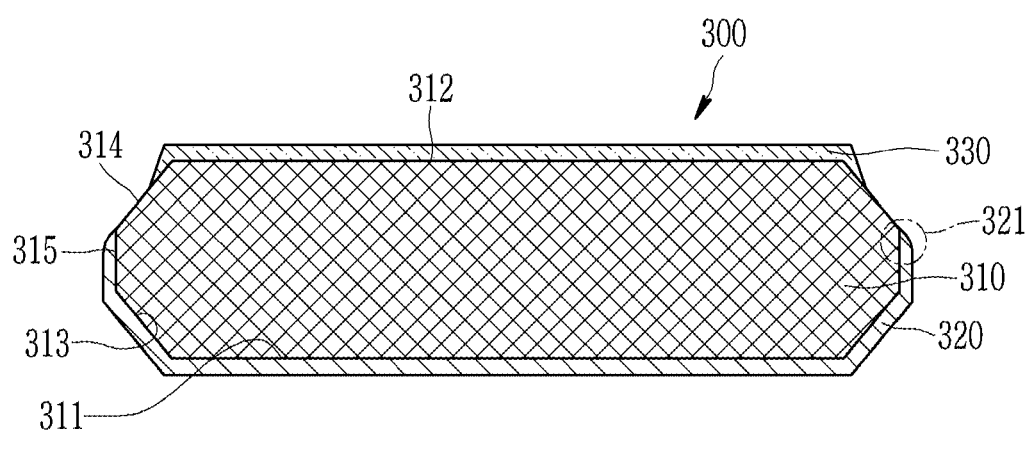
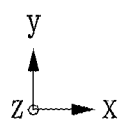

WINDOW AND DISPLAY DEVICE COMPRISING THE SAME

CROSS-REFERENCE TO RELATED APPLICATION

This application claims priority from and the benefit of Korean Patent Application No. 10-2018-0077218, filed on Jul. 3, 2018, and U.S. Patent Application No. 62/683,773, filed on Jun. 12, 2018, which are hereby incorporated by reference for all purposes as if fully set forth herein.

BACKGROUND

Field

Exemplary embodiments of the invention relate to a window and a display device including the same.

Discussion of the Background

Recently, a variety of mobile electronic devices such as mobile phones, navigation devices, digital cameras, electronic books, and portable game machines, and various terminals to which a display device including a liquid crystal display (LCD) or an organic light emitting diode display (OLED) is applied, have been used.

A typical display device used in such a mobile electronic device may be provided with a cover window (hereinafter referred to as a window) which is transparent so that a user can see the display portion in the front of a display panel. Since such a window is located at the outermost position of the display device, it must be strong against external impact so as to protect the display panel inside the display device.

In addition, a structure using a touch panel integrally formed with a display screen has become widespread in recent years, instead of conventional electronic devices using a switch or a keyboard as an input device. Accordingly, the surface of the window is often in contact with a finger or the like as compared with the conventional mobile device, and thus a window with greater structural integrity is required.

The above information disclosed in this Background section is only for understanding of the background of the inventive concepts, and, therefore, it may contain information that does not constitute prior art.

SUMMARY

Exemplary embodiments of the inventive concepts are capable of providing a window that is thin, is light in weight, and which has excellent in impact resistance, as well as a display device including the window.

Additional features of the inventive concepts will be set forth in the description which follows, and in part will be apparent from the description, or may be learned by practice of the inventive concepts.

An exemplary embodiment of the present invention provides a window including: a base substrate; a first coating layer disposed on a first surface of the base substrate; and a second coating layer disposed on a second surface that overlaps the first surface of the base substrate, wherein the base substrate further includes a vertical surface perpendicular to the first surface and the second surface, and the first coating layer overlaps the vertical surface.

The base substrate may further include a first inclined surface that is inclined with respect to the first surface, and the first inclined surface may connect the first surface and the vertical surface.

The first coating layer may overlap the first inclined surface.

An end of the first coating layer may be inclined with respect to the base substrate.

The first coating layer may directly contact the second coating layer.

The base substrate may further include a second inclined surface that is inclined with respect to the second surface, and the second inclined surface may connect the second surface and the vertical surface.

The second inclined surface may include a curved surface.

The second coating layer may overlap the second inclined surface.

The first coating layer may include methyl T polydimethylsiloxane.

The first coating layer may further include at least one of octamethylcyclotetrasiloxane and dimethylsiloxane.

The first coating layer may further include a melamine resin.

A thickness of the first coating layer may be in a range of 7 μm to 13 μm.

The base substrate and the first coating layer may be covalently bonded to each other.

An exemplary embodiment of the present invention provides a window including: a base substrate configured to include a first surface and a second surface; and a first coating layer disposed on a first surface of the base substrate, wherein the base substrate further includes a vertical surface perpendicular to the first surface and the second surface, and the first coating layer overlaps the vertical surface.

The window may further include a second coating layer disposed on the second surface of the base substrate.

An exemplary embodiment of the present invention provides a display device including: a display panel; and a window configured to overlap the display panel, wherein the window includes: a base substrate; a first coating layer disposed on a first surface of the base substrate; and a second coating layer disposed on a second surface that overlaps the first surface of the base substrate, wherein the base substrate further includes a vertical surface perpendicular to the first surface and the second surface, and the first coating layer overlaps the vertical surface.

The first surface of the base substrate may be a surface that faces the display panel.

The display panel may be flexible.

The base substrate may further include a first inclined surface that is inclined with respect to the first surface, the first inclined surface may contact the first surface and the vertical surface, and the first coating layer may overlap the first inclined surface.

A first surface of the base substrate may include a groove, and the first coating layer may fill the groove.

The display device may further include an adhesive layer and a light blocking layer disposed between the first coating layer and the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 1A illustrates a cross-sectional view of a display device including a window according to an exemplary embodiment.

FIG. 1B illustrates a cross-sectional view of a display device including a window according to an exemplary embodiment.

FIG. 3 illustrates a cross-sectional view of a window according to an exemplary embodiment.

DETAILED DESCRIPTION OF THE EMBODIMENTS

Figure 2:
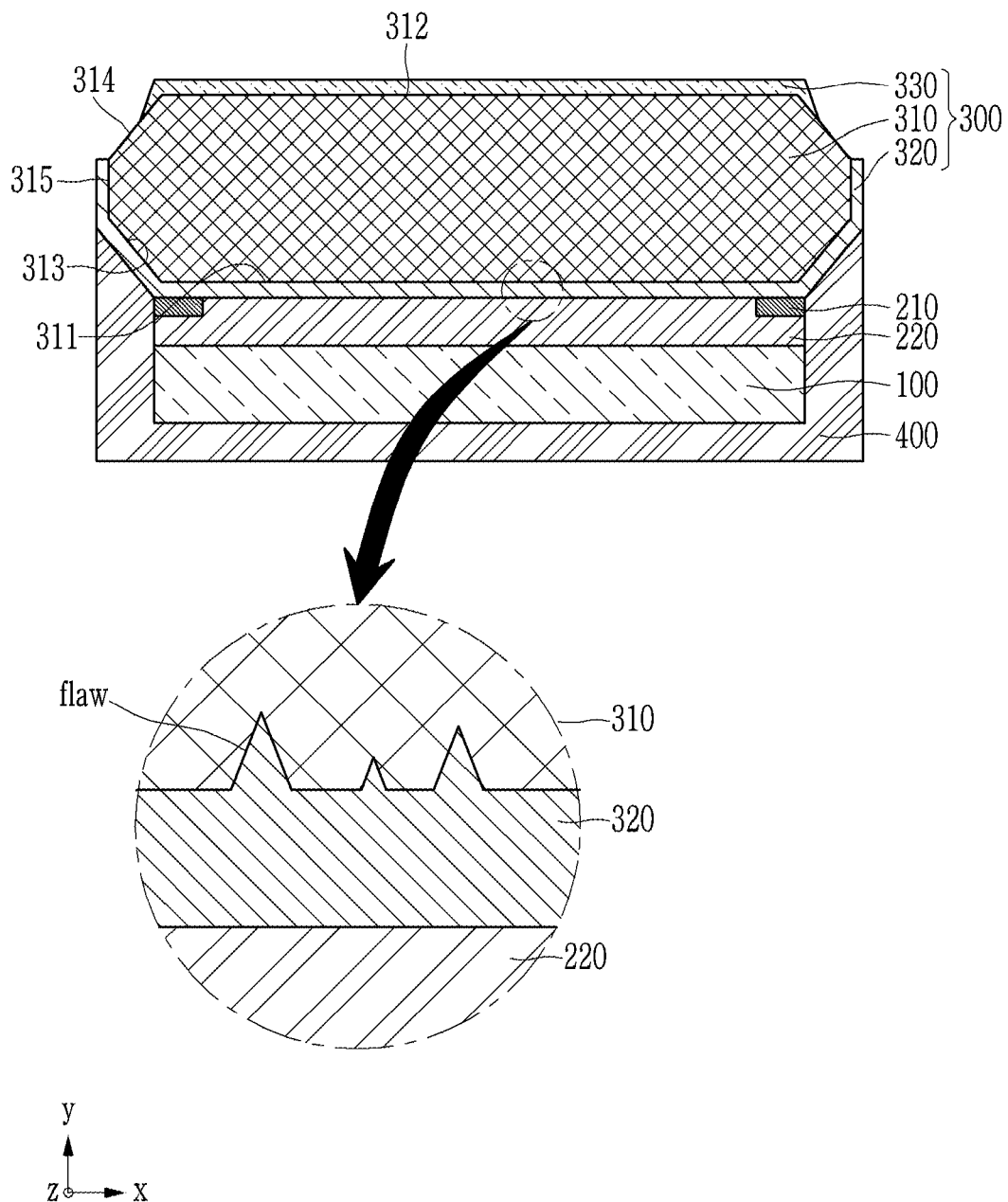
FIG. 2 illustrates a cross-sectional view of a display device including a window according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in the specification, the phrase "in a plan view" means when an object portion is viewed from above, and the phrase "in a cross-section" means when a cross-section taken by vertically cutting an object portion is viewed from the side.

Hereinafter, a window and a display device including the window according to an exemplary embodiment will be described with reference to FIG. 1A. FIG. 1A illustrates a cross-sectional view of a display device including a window according to an exemplary embodiment.

As shown in FIG. 1A, the display device according to an exemplary embodiment includes a display panel 100 and a window 300 disposed on the display panel 100. An adhesive layer 220 is disposed between the display panel 100 and the window 300 to couple the display panel 100 to the window 300.

The display panel 100 may be flexible, stretchable, foldable, bendable, or rollable. The display panel 100 may have flexibility so that it is bendable, but the present invention is not limited thereto. The display panel 100 may be a flat display panel 100.

The display panel 100 may be an organic light emitting diode display panel. The display panel 100 may include a substrate and a plurality of thin film transistors, a plurality of electrodes, and the like disposed on the substrate.

Although the exemplary embodiment in which the display panel 100 is the organic light emitting diode display panel has been described, the present invention is not limited thereto. The display panel 100 according to another embodiment may be a liquid crystal display panel, an electrophoretic display panel, an electrowetting display panel, or the like.

The adhesive layer 220 is disposed between the display panel 100 and the window 300 to couple the display panel 100 to the window 300.

The adhesive layer 220 may be a transparent polymer resin layer. An example of the adhesive layer 220 may include at least one of an optically clear adhesive (OCA), an optically clear resin (OCR), a pressure sensitive adhesive (PSA), and a super view resin.

A light blocking layer 210 may be disposed between the adhesive layer 220 and the window 300. The light blocking layer 210 contains a material capable of blocking light. The light blocking layer 210 may be disposed to correspond to a bezel region of the display device according to an exemplary embodiment. The light blocking layer 210 may be omitted according to an exemplary embodiment.

The window 300 may be disposed on the display panel 100, and may be coupled to the display panel 100 by the adhesive layer 220. The window 300 may protect the display panel 100 from the outside.

According to the present exemplary embodiment, the window 300 includes a base substrate 310, a first coating layer 320, and a second coating layer 330.

The base substrate 310 may have a plate shape, and may be a glass substrate or a plastic substrate according to an exemplary embodiment. Although the present specification shows a configuration in which the base substrate 310 is composed of a single layer, the present invention is not limited thereto, and the base substrate 310 may include a plurality of layers.

The base substrate 310 may contain a glass material, including, i.e., a silicate. The glass material may further contain an additional material to make it excellent in durability, surface smoothness, and transparency. For example, the base substrate 310 may include aluminosilicates, borosilicates, boroaluminosilicates, and the like. The base substrate 310 may further include alkali metals, alkaline earth metals, oxides thereof, and the like, and is not limited to the above-described materials.

The base substrate 310 may include a first surface 311 that faces the first coating layer 320 and a second surface 312 that faces the second coating layer 330. The base substrate 310 further includes a vertical surface 315 that is perpendicular to the first surface 311 and the second surface 312.

The first coating layer 320 is disposed between the base substrate 310 and the adhesive layer 220. According to an exemplary embodiment, the first coating layer 320 may overlap the first surface 311 and the vertical surface 315 of the base substrate 310. The first coating layer 320 may entirely overlap the first surface 311 and may partially overlap the vertical surface 315. However, the present exemplary embodiment is not limited thereto. For example, the first coating layer 320 may entirely overlap the vertical surface 315.

The first coating layer 320 can improve impact resistance of the window 300. The first coating layer 320 may prevent the base substrate 310 from being broken by offsetting a stress generated in the base substrate 310 by an impact applied to the base substrate 310. The first coating layer 320 may absorb impact energy and may have a good close contacting property with the base substrate 310.

The first coating layer 320 may directly contact the base substrate 310. In addition, the first coating layer 320 may overlap the adhesive layer 220 and the light blocking layer 210. According to an exemplary embodiment, the first coating layer 320 may be in a chemically bonded state with the base substrate 310. For example, the first coating layer 320 may be covalently bonded to a Si—O bond of the base substrate 310. Since the first coating layer 320 and the first surface 311 of the base substrate 310 are connected to each other with a strong coupling force, they may have excellent adherence and may have a completely coupled form.

The first coating layer 320 may be formed on the base substrate 310 using a wet coating method. For example, the first coating layer 320 may be formed using slip coating, bar coating, spin coating, spray coating, or the like.

The first coating layer 320 may have a thickness that is in a range of about 7 μm to about 13 μm. When the thickness of the first coating layer 320 is less than about 7 μm, sufficient impact resistance required for the window may not be provided. When the thickness of the first coating layer 320 is greater than about 13 μm, yellowing may occur in the window. Although the present specification describes the exemplary embodiment in which the first coating layer 320 has the same thickness with respect to the vertical surface 315, the present invention is not limited thereto. The thickness of the first coating layer 320 may be reduced toward the end of the first coating layer 320.

The first coating layer 320 may include a cured body in which a first solution is cured.

The first solution may include a main binder, a defoaming agent, and a leveling agent. The main binder may include methylthiopolydimethylsiloxane, the defoaming agent may include octamethylcyclotetrasiloxane, and the leveling agent may include dimethylsiloxane. The first solution may further include a solvent, which may be diethylene glycol monobutyl ether as an example.

The first solution may include the main binder in an amount of 70 wt % to 80 wt % with respect to a total amount of the first solution, the defoaming agent in an amount of 1 wt % to 5 wt % with respect to the total amount of the first solution, and a leveling agent in an amount of 0.1 wt % to 0.8 wt % with respect to the total amount of the first solution, and a remainder of solvent.

According to an exemplary embodiment, the first solution may further include a melamine resin. The melamine resin may be included in an amount of 8 wt % to 12 wt % with respect to the total amount of the first solution. The melamine resin may improve alkali resistance of the window.

The first solution may have a viscosity of about 6 cps to about 8 cps.

The first coating layer 320 including the cured body obtained by curing the first solution may include the main binder, the defoaming agent, and the leveling agent that remain on the first coating layer 320. According to an exemplary embodiment, the first coating layer 320 may include at least one of methyl T polydimethylsiloxane, octamethylcyclotetrasiloxane, and dimethyl siloxane.

The second coating layer 330 is disposed on an outer circumferential surface of the window 300. The second coating layer 330 may overlap the second surface 312 of the base substrate 310. The second coating layer 330 may be disposed on the second surface 312 which is directly touched by a user. The second coating layer 330 may improve surface hardness of the window 300.

The second coating layer 330 may include at least one of an organic material, an inorganic material, and an organic and inorganic composite compound. The organic material may include an acrylic compound, an epoxy compound, or a combination thereof, the inorganic material may include silica, alumina, or a combination thereof, and the organic and inorganic composite compound may include a polysilsesquioxane.

The second coating layer 330 may include a single layer or a plurality of layers. A thickness of the second coating layer 330 may be in range of about 10 μm to about 30 μm.

The second coating layer 330 may include an anti-fingerprint layer, an anti-reflective layer, and the like. A problem of fingerprints remaining on a surface of the window may be solved through the anti-fingerprint layer, and a problem of an increase of external light reflectance may be solved through the anti-reflective layer.

According to an exemplary embodiment, a display device including the window may provide sufficient impact resistance and rigidity by providing the base substrate 310 with the first coating layer 320 having a relatively thin thickness. As a result, the weight and volume of the window 300 itself may be reduced, and the cost required for manufacturing the window 300 may be reduced. Since the weight and volume of the window 300 is reduced, the weight and volume of the display device including the window 300 may also be reduced. Alternatively, battery capacity provided to the display device may be increased in a space secured through reducing the thickness of the window 300.

Hereinafter, a window and a display device according to an exemplary embodiment will be described with reference to FIG. 1B. FIG. 1B illustrates a cross-sectional view of a display device including a window according to an exemplary embodiment. Description of the same constituent elements as those described with reference to FIG. 1A will be omitted.

According to the present exemplary embodiment, the window 300 may include a base substrate 310 and a first coating layer 320. The second coating layer 330 of the exemplary embodiment illustrated in FIG. 1A may be omitted. According to an exemplary embodiment, the window 300 may include only the first coating layer 320 located on the first surface 311 of the base substrate 310.

Hereinafter, a display device including a window according to an exemplary embodiment will be described with reference to FIG. 2. FIG. 2 illustrates a cross-sectional view of a display device including a window according to an exemplary embodiment. Description of the same configurations as in the above-described constituent elements will be omitted.

According to the present exemplary embodiment, the display device may further include a housing 400 that surrounds the display panel 100 and the window 300. The housing 400 is not limited to the illustrated shape, and may have any form surrounding the display panel 100 and the window 300.

According the present exemplary embodiment, the window 300 includes a base substrate 310, a first coating layer 320, and a second coating layer 330.

The base substrate 310 includes a first surface 311 that faces the first coating layer 320, a second surface 312 that faces the second coating layer 330, and a vertical surface 315 that is perpendicular to the first surface 311 and the second surface 312. The first surface 311 is a surface of the base substrate 310 facing the display panel 100, and the second surface 312 is a surface of the base substrate 310 facing a user.

The base substrate 310 further includes a first inclined surface 313 inclined with respect to the first surface 311, and the first inclined surface 313 is a surface connecting the first surface 311 and the vertical surface 315. The base substrate 310 may further include a second inclined surface 314 inclined with respect to the second surface 312. The second inclined surface 314 serves to connect the second surface 312 and the vertical surface 315.

The first coating layer 320 is disposed between the base substrate 310 and the adhesive layer 220. According to an exemplary embodiment, the first coating layer 320 may overlap the first surface 311 of the base substrate 310, the first inclined surface 313, and the vertical surface 315. The first coating layer 320 may entirely overlap the first surface 311 and the first inclined surface 313. Although the present specification describes the exemplary embodiment in which the first coating layer 320 overlaps the vertical surface 315, it is not limited thereto. The first coating layer 320 may partially overlap the vertical surface 315.

The first coating layer 320 may improve impact resistance of the window 300 by overlapping not only the first surface 311 of the base substrate 310 but also the first inclined surface 313 and the vertical surface 315. The first coating layer 320 may prevent the base substrate 310 from being broken by offsetting a stress generated in the base substrate 310 by an impact applied to the base substrate 310.

According to an exemplary embodiment, when the base substrate 310 is made of a glass material, a flaw may exist on a surface of the base substrate 310. The flaw may act as a defect to cause damage to the window 300.

According to an exemplary embodiment, the first coating layer 320 may fill a surface of the base substrate 310 on which the flaw is formed. The first coating layer 320 may have a form that fills the flaw. The first coating layer 320 completely covers the flaw, thereby reducing a possibility of breakage of the window 300.

The second coating layer 330 may overlap the second surface 312 of the base substrate 310. In addition, the second coating layer 330 may partially overlap the second inclined surface 314.

According to the present exemplary embodiment, the display device including the window 300 may reduce breakage of the window 300 by improving impact resistance of the window 300 through the first coating layer 320 which covers the first surface 311, the inclined surface 313, and the vertical surface 315 of the base substrate 310.

Figure 4:
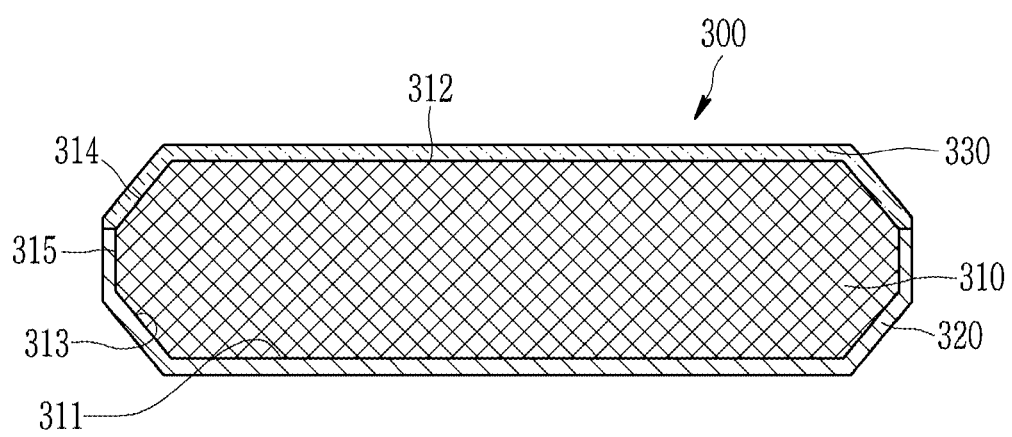
FIG. 4 illustrates a cross-sectional view of a window according to an exemplary embodiment.
Figure 5:
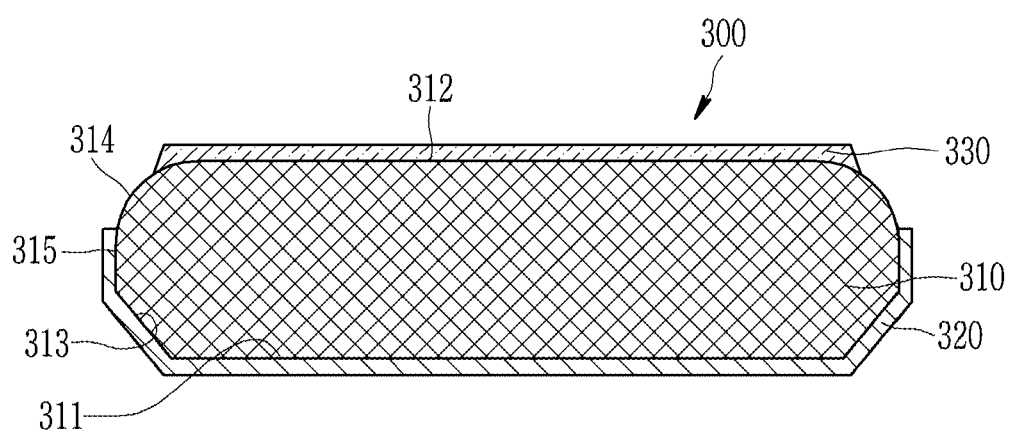
FIG. 5 illustrates a cross-sectional view of a window according to an exemplary embodiment.
Figure 6:
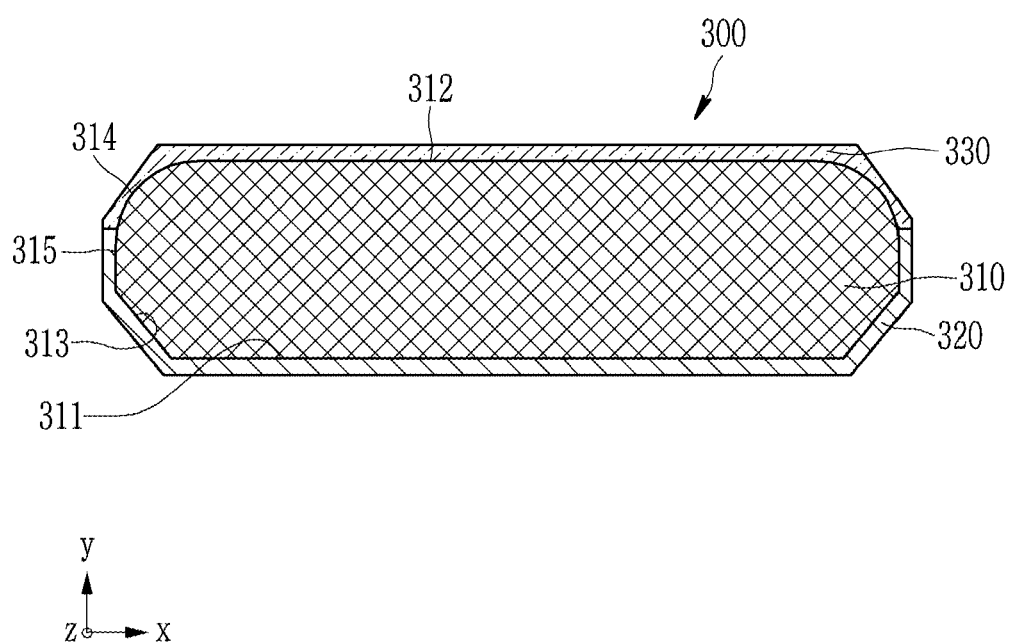
FIG. 6 illustrates a cross-sectional view of a window according to an exemplary embodiment.

Hereinafter, a window according to an exemplary embodiment will be described with reference to FIG. 3 to FIG. 6. The window according to FIG. 3 to FIG. 6 may replace the window illustrated in FIG. 2. FIG. 3 illustrates a cross-sectional view of a window according to an exemplary embodiment, FIG. 4 illustrates a cross-sectional view of a window according to an exemplary embodiment, FIG. 5 illustrates a cross-sectional view of a window according to an exemplary embodiment, and FIG. 6 illustrates a cross-sectional view of a window according to an exemplary embodiment. Description of the same configuration as the above-described constituent elements will be omitted.

Referring to FIG. 3, an end 321 of the first coating layer 320 may have an inclined shape toward the vertical surface 315 of the base substrate 310. The first coating layer 320 may be formed of a solution having a predetermined viscosity. The end 321 of the first coating layer 320 may have a tapered shape toward a surface of the base substrate 310 in the process of applying and curing the solution. The end 321 of the first coating layer 320 may become thinner toward the vertical surface 315 of the base substrate 310.

Although the present specification describes the exemplary embodiment in which the end 321 of the first coating layer 320 is aligned with the end of the vertical surface 315, it is not limited thereto. Any embodiment where the end 321 of the first coating layer 320 is disposed on the second inclined surface 314 or on the vertical surface 315 is possible.

Referring to FIG. 4, the second coating layer 330 may be disposed on the second inclined surface 314 as well as on the second surface 312 of the base substrate 310. According to an exemplary embodiment, the second coating layer 330 may completely cover the second inclined surface 314 and may contact the first coating layer 320. The first coating layer 320 and the second coating layer 330 may contact each other at an end where the second inclined surface 314 and the vertical surface 315 meet, but the present invention is not limited thereto. According to an exemplary embodiment, a contact surface of the first coating layer 320 and the second coating layer 330 may be disposed on the second inclined surface 314.

In addition, the present specification describes a configuration in which a surface of the end of the first coating layer 320 and a surface of the end of the second coating layer 330 are in contact with each other, but the present invention is not limited thereto. The end of the first coating layer 320 may be covered with the end of the second coating layer 330, or the end of the second coating layer 330 may be covered with the end of the first coating layer 320.

Referring to FIG. 5, the second inclined surface 314 connecting the second surface 312 and the vertical surface 315 of the base substrate 310 may include a convex curved surface. Although the present specification describes the second inclined surface 314 as having a convex curved surface shape, the present invention is not limited thereto. The second inclined surface 314 may have a concave curved surface shape.

The first inclined surface 313 of the base substrate 310 is flat, and the second inclined surface 314 is curved. Accordingly, the base substrate 310 may have an asymmetric shape along the y-axis direction.

Referring to FIG. 6, according to the present exemplary embodiment, the second coating layer 330 may overlap the second surface 312 of the base substrate 310 and the curved second inclined surface 314. The second coating layer 330 may completely overlap the second inclined surface 314. According to an exemplary embodiment, the second coating layer 330 may contact the first coating layer 320.

The first coating layer 320 and the second coating layer 330 may contact each other at the end where the curved second inclined surface 314 and the vertical surface 315 meet. However, the present invention is not limited thereto. A boundary between the first coating layer 320 and the second coating layer 330 may be disposed on the second inclined surface 314 or on the vertical surface 315.

In addition, the present specification describes that a surface of the end of the first coating layer 320 and a surface of the end of the second coating layer 330 are in contact with each other, but the present invention is not limited thereto. The end of the first coating layer 320 may be covered with the end of the second coating layer 330, or the end of the second coating layer 330 may be covered with the end of the first coating layer 320.

In the present specification, the window 300 according to the exemplary embodiment has been described with reference to FIG. 3 to FIG. 6, and it shall be obvious that configurations included in each window 300 may be implemented in combination.

Figure 7:
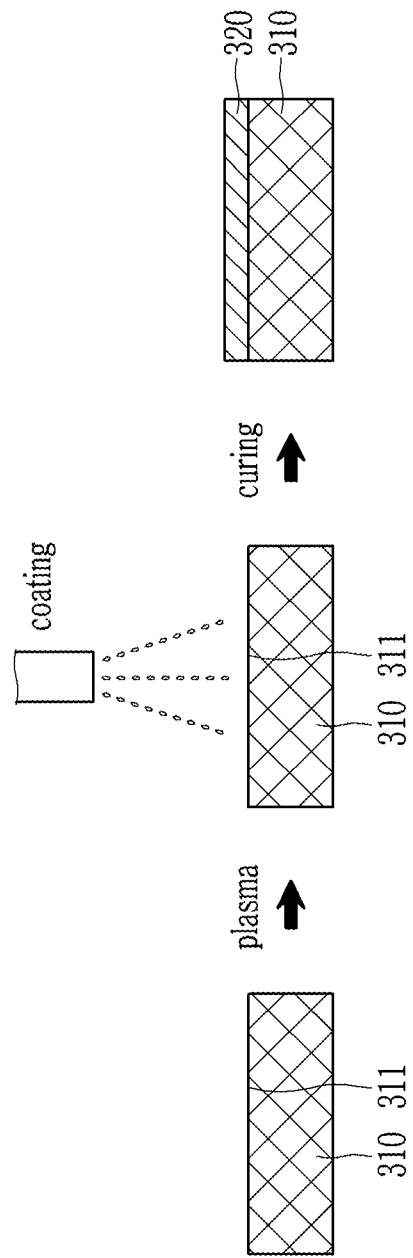
FIG. 7 illustrates a manufacturing process of a window according to an exemplary embodiment.

Hereinafter, a manufacturing method of a window according to an exemplary embodiment will be briefly described with reference to FIG. 7. FIG. 7 illustrates a manufacturing process of a window according to an exemplary embodiment. Although FIG. 7 illustrates the case that the base substrate is a rectangular plate, the shape of the base substrate may be variously changed as illustrated in FIG. 3 to FIG. 6.

Referring to FIG. 7, the first surface 311 of the base substrate 310 is subjected to plasma treatment. The plasma treatment may be conducted in an $N_2$ or argon gas atmosphere.

The first solution is then coated on the first surface 311 of the plasma-treated base substrate 310. The first surface 311 of the plasma-treated base substrate 310 and the first solution may have a strong coupling force. The coating method may not be limited, but spray coating may be used according to an exemplary embodiment.

Next, the coated solution may be cured at 170° C. for 30 minutes to form the first coating layer 320 disposed on the first surface 311 of the base substrate 310.

Figure 8:
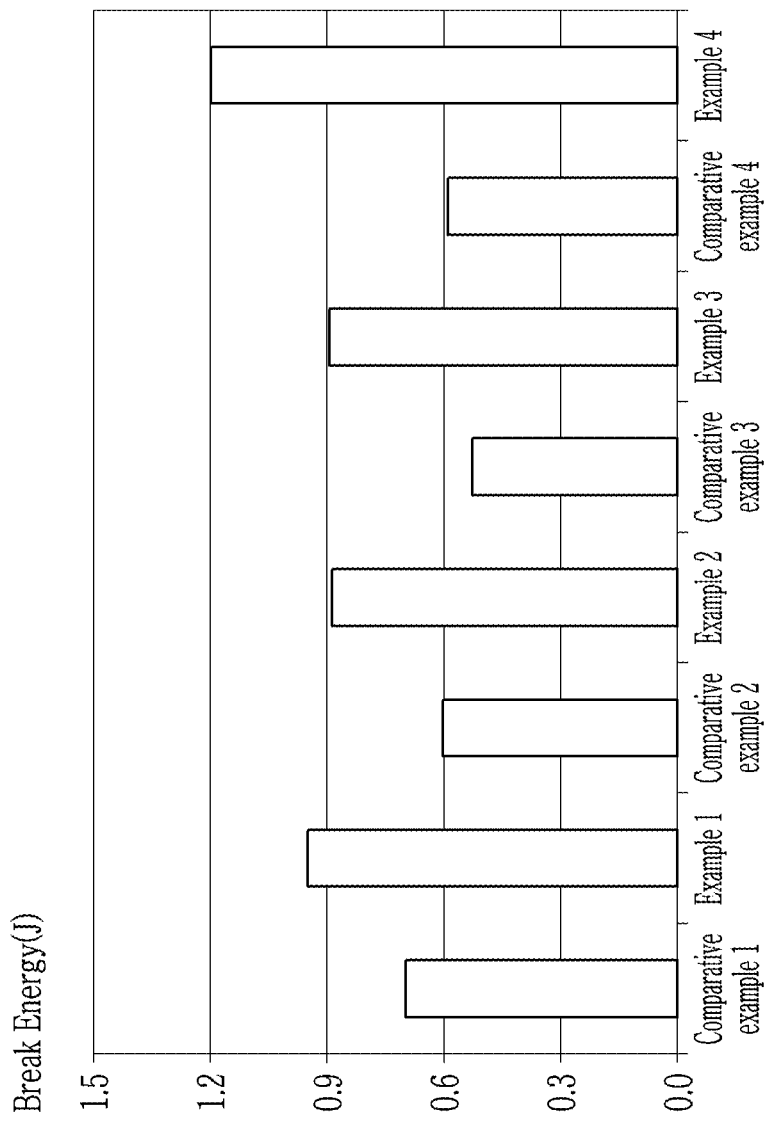
FIG. 8 is a graph illustrating break energy according to exemplary embodiments and comparative examples.
Figure 9:
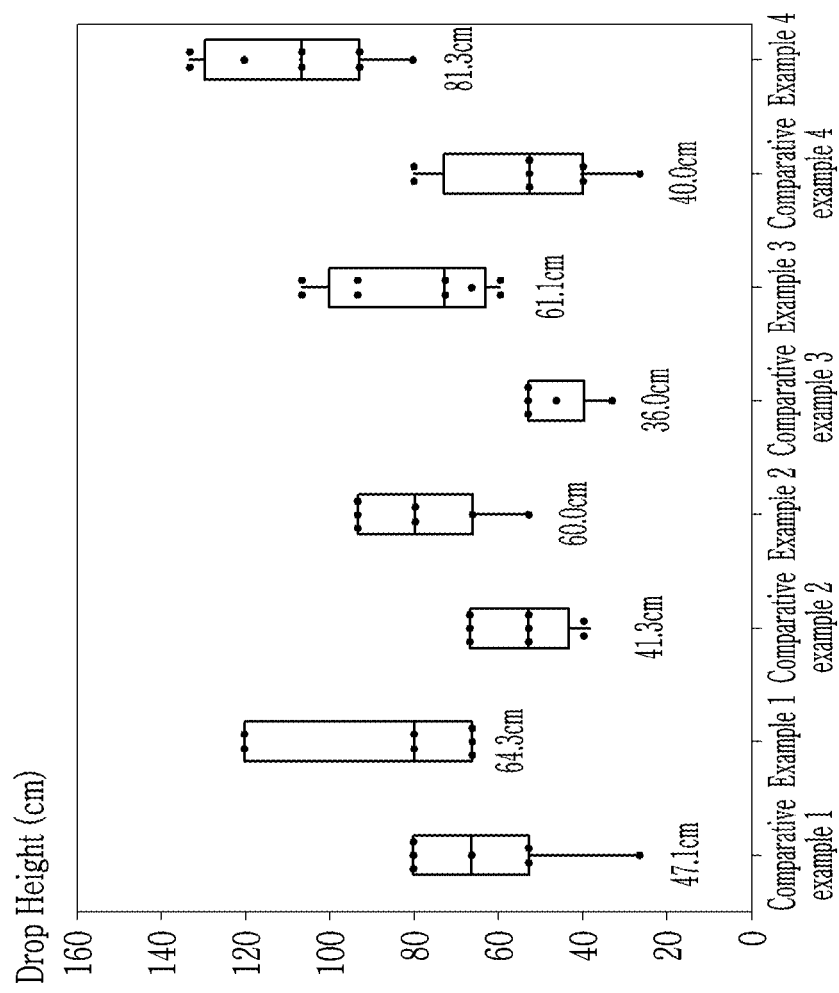
FIG. 9 is a graph illustrating results of ball drop tests according to exemplary embodiments and comparative examples.
Figure 10:
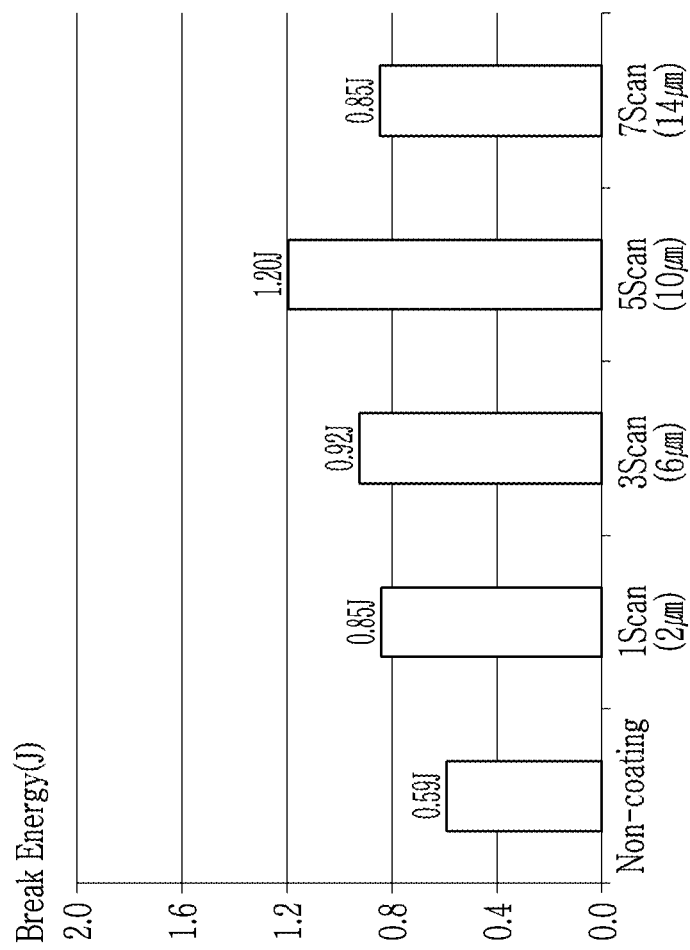
FIG. 10 is a graph illustrating break energy according to a thickness of a first coating layer.
Figure 11:
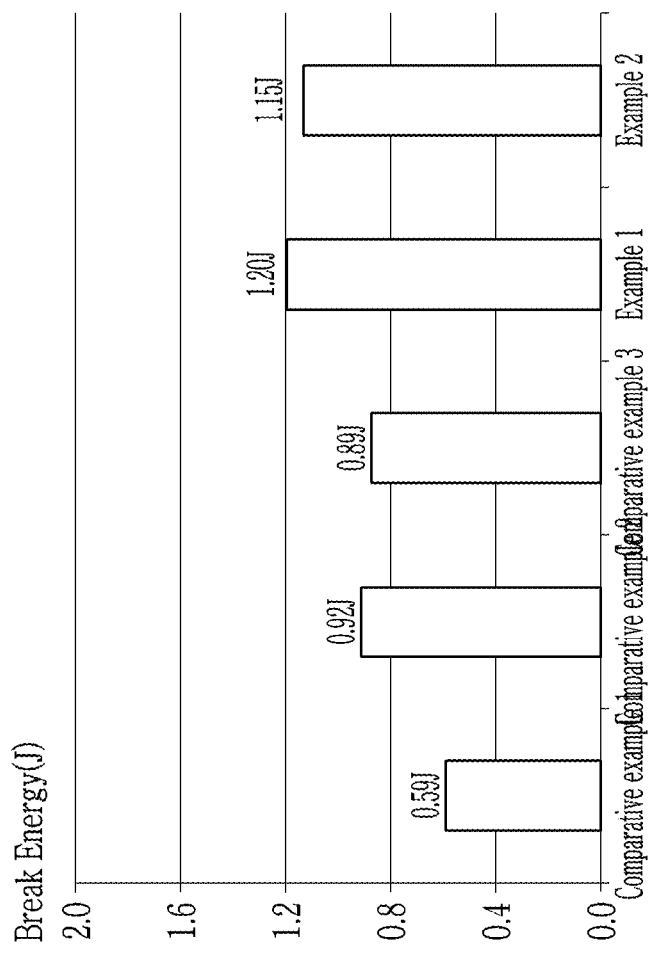
FIG. 11 is a graph illustrating break energy according to whether a plasma process is performed and a process sequence.
Figure 12:
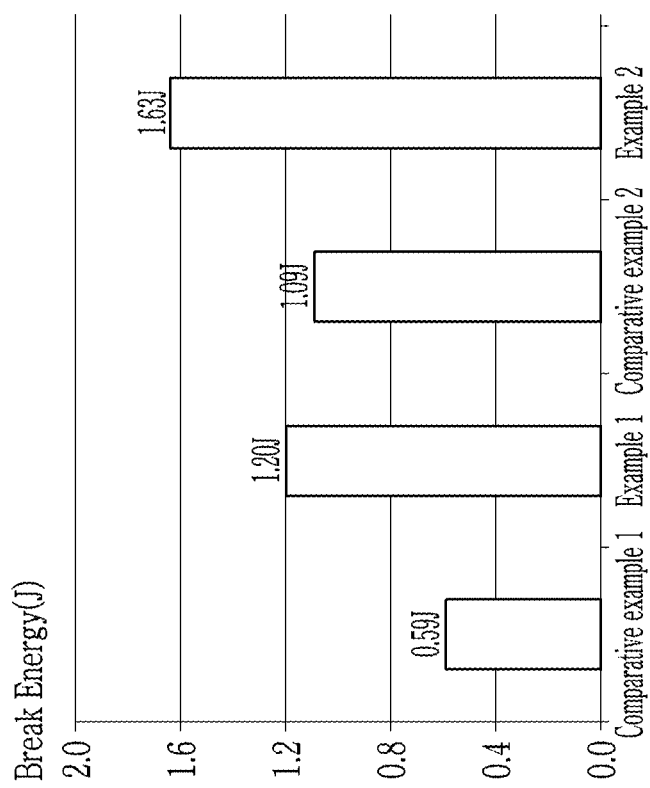
FIG. 12 is a graph illustrating break energy according to exemplary embodiments and comparative examples.
Figure 13:
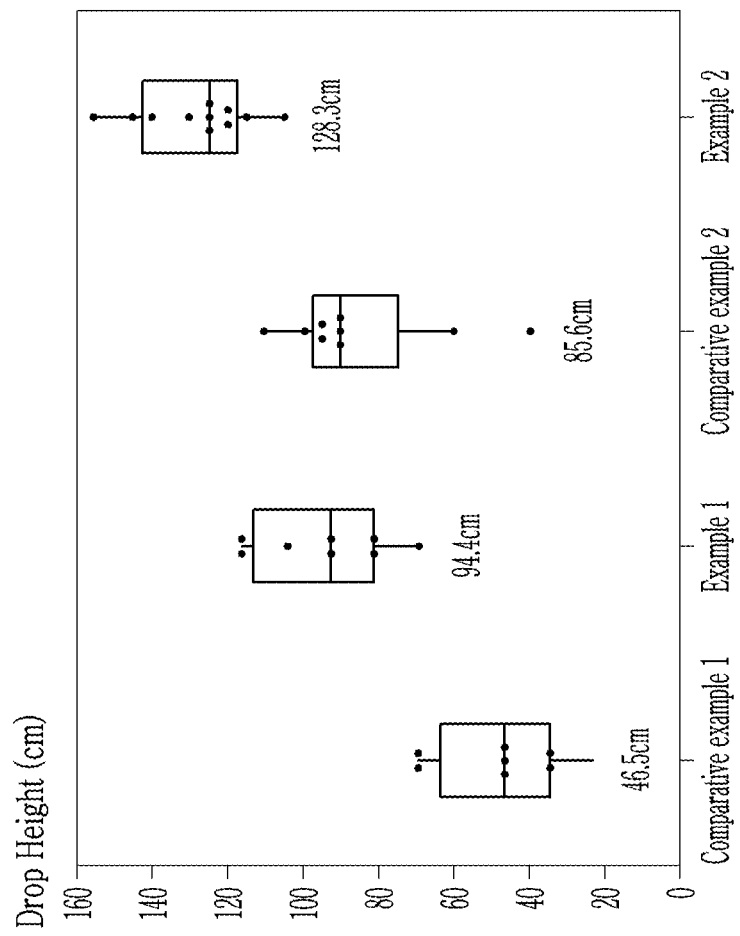
FIG. 13 is a graph illustrating results of ball drop tests according to the comparative examples and the exemplary embodiments of FIG. 12.
Figure 14:
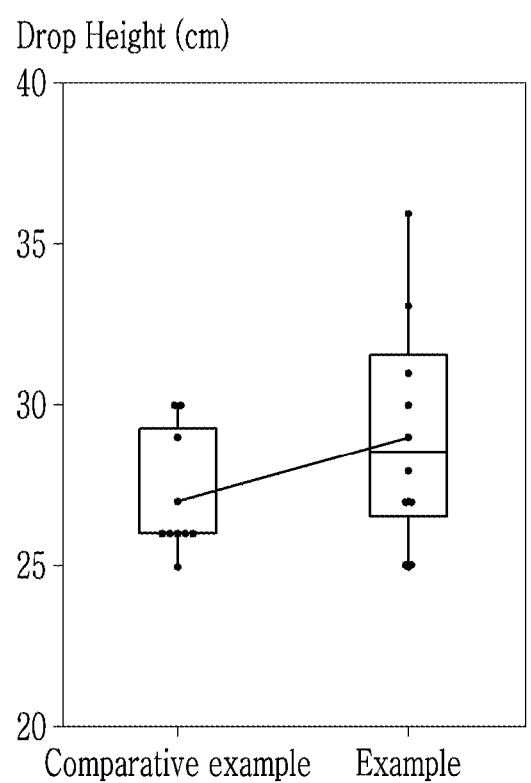
FIG. 14 is a graph illustrating results of tested heights at which bright points are generated according to a comparative example and an exemplary embodiment.
Figure 15:
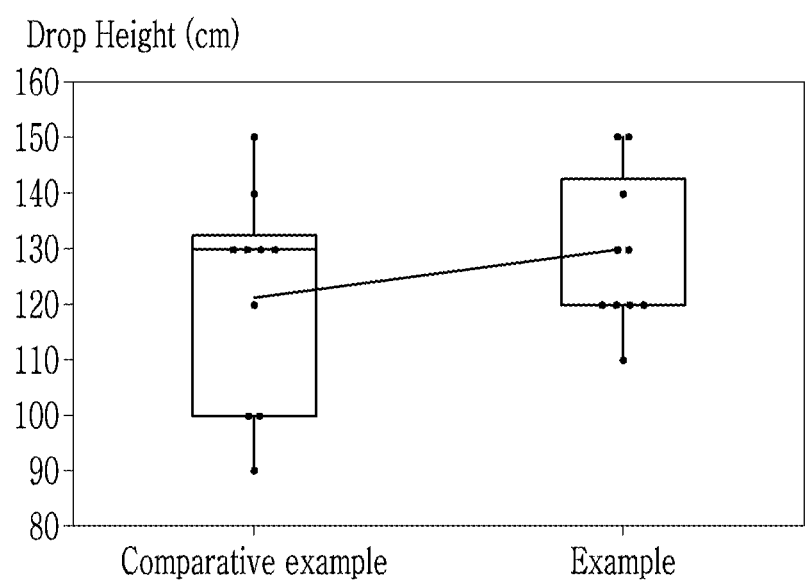
FIG. 15 is a graph illustrating results of impact resistance heights tested according to a comparative example and an exemplary embodiment.
Figure 16:
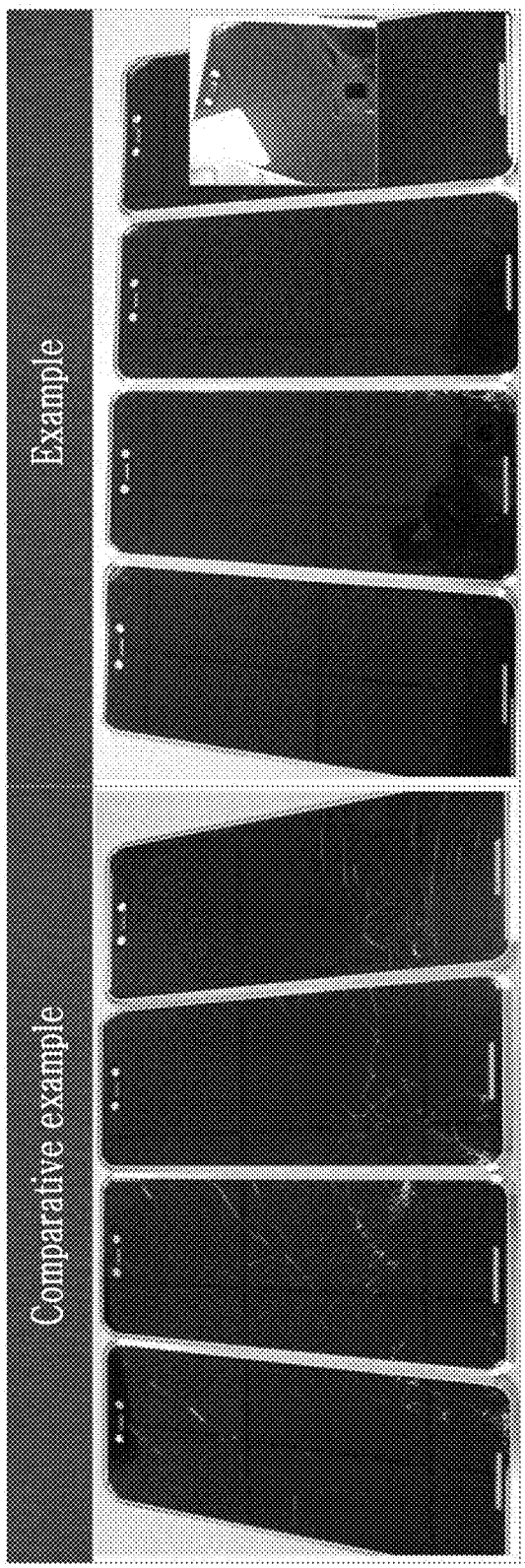
FIG. 16 illustrates images of results of testing crack growth according to a comparative example and an exemplary embodiment.

Hereinafter, a window according to examples and comparative examples will be described with reference to FIG. 8 to FIG. 16. FIG. 8 is a graph illustrating break energy according to examples and comparative examples, FIG. 9 is a graph illustrating results of ball drop tests according to examples and comparative examples, FIG. 10 is a graph illustrating break energy according to a thickness of a first coating layer, FIG. 11 is a graph illustrating break energy according to whether a plasma process is performed and a process sequence, FIG. 12 is a graph illustrating break energy according to examples and comparative examples, FIG. 13 is a graph illustrating results of ball drop tests according to the comparative examples and the examples of FIG. 12, FIG. 14 is a graph illustrating tested results of heights at which bright points are generated according to a comparative example and an example, FIG. 15 is a graph illustrating results of impact resistance heights tested according to a comparative example and an example, and FIG. 16 illustrates images of results of testing crack growth according to a comparative example and an example.

Referring to FIG. 8, a base substrate having break energy of about 0.7 J is provided according to Comparative Example 1. The break energy is 0.95 J in the case of Example 1 where a first coating layer according to an exemplary embodiment is formed on the same base substrate. It is seen that Example 1 has break energy that is increased by about 1.4 times as compared with Comparative Example 1.

A base substrate having break energy of about 0.61 J is provided according to Comparative Example 2. The break energy is 0.89 J in the case of Example 2 where a first coating layer according to an exemplary embodiment is formed on the same base substrate. It is seen that Example 2 has break energy that is increased by about 1.5 times as compared with Comparative Example 2.

A base substrate having break energy of about 0.53 J is provided according to Comparative Example 3. The break energy is 0.9 J in the case of Example 3 where a first coating layer according to an exemplary embodiment is formed on the same base substrate. It is seen that Example 2 has break energy that is increased by about 1.5 times as compared with Comparative Example 2.

A base substrate having break energy of about 0.59 J is provided according to Comparative Example 4. The break energy is 1.20 J in the case of Example 4 where a first coating layer according to an exemplary embodiment is formed on the same base substrate. It is seen that Example 4 has break energy that is increased by about 2.0 times as compared with Comparative Example 2.

It is seen that the window including the first coating layer has break energy that is 1.4 to 2.0 times larger than the window not including the first coating layer, as a result of comparing Comparative Example 1 to Comparative Example 4 with Example 1 to Example 4. The break energy indicates energy required to break the window, and larger break energy indicates better impact resistance of the window. As a result, it is seen that the window according to the exemplary embodiment has improved impact resistance.

FIG. 9 illustrates results of performing ball drop tests on the window according to Example 1 to Example 4 and Comparative Example 1 to Comparative Example 4 of FIG. 8. The ball drop tests were repeated several times to display quartiles in the graph.

The ball drop tests were performed by dropping a metal ball with a weight of 151 g at different heights onto the window and recording limit heights at which the window is free from whitening or cracking. The ball drop test is an experiment to measure the impact resistance of the window, and a higher limit height leads to higher impact resistance.

According to FIG. 9, it is seen that Comparative Example 1 has a limit height of about 47.1 cm, and Example 1 has a limit height of about 64.3 cm. It is seen that Comparative Example 2 has a limit height of about 41.3 cm, and Example 2 has a limit height of about 60.0 cm. It is seen that Comparative Example 3 has a limit height of about 36.0 cm, and Example 3 has a limit height of about 61.1 cm. It is seen that Comparative Example 4 has a limit height of about 40.0, and Example 4 has a limit height of about 81.3 cm. It is seen that Examples 1 to 4 have large limit heights compared to Comparative Examples 1 to 4. As a result, it is seen that the impact resistance of the window is excellent when the first coating layer is included like in the examples.

Referring to FIG. 10, a base substrate may have break energy of about 0.59 J in the case of a base substrate including no first coating layer. In this case, the base substrate is subjected to several coating processes to examine the change in the break energy according to the thickness of the first coating layer. A coating layer of a thickness of about 2 μm may be formed through a one-time coating (scan) process.

First, when the first coating layer having the thickness of 2 μm is formed on the base substrate by performing the coating process, the break energy is increased to about 0.85 J. When the first coating layer having a thickness of 6 μm is formed on the base substrate through the three-time coating process, the break energy is increased to about 0.92 J. When the first coating layer having a thickness of 10 μm is formed on the base substrate through the five-time coating process, the break energy is increased to about 1.20 J. When the first coating layer having a thickness of 14 µm is formed on the base substrate through the seven-time coating process, the break energy is decreased to about 0.85 J.

According to the above description, it is seen that it is possible to obtain excellent impact resistance and a greatest stiffness effect by the first coating layer when the thickness of the first coating layer is in a range of about 7 µm to about 13 µm, rather than seeing the impact resistance being improved as the thickness of the first coating layer is increased.

TABLE 1

|  | Non-coating | 1-time scan | 3-time scan | 5-time scan | 7-time scan |
| --- | --- | --- | --- | --- | --- |
| Yellowing index (YI) | 0.23 | 0.25 | 0.30 | 0.34 | 0.68 |

According to Table 1, it is seen that the base substrate including no first coating layer has a yellowing index of 0.23, and as the number of coatings increases, the yellowing index of the window increases. Particularly, it is seen that the yellowing index increased considerably in the case of performing the coating process 7 times as compared with 5 times. According to FIG. 10 and Table 1, the break energy may be reduced when the thickness of the first coating layer is too thin or thick. In addition, when the thickness of the first coating layer is too thick, the yellowing index of the window may be considerably high. It is seen that the first coating layer according to an exemplary embodiment may have a thickness of about 7 µm to about 13 µm to satisfy the impact resistance and the transparency required for the window. Next, in FIG. 11, according to Comparative Example 1, only the base substrate is included, and the break energy is 0.59 J. According to Comparative Example 2, the first coating layer formed on the base substrate without the plasma treatment process is included. According to Comparative Example 3, the first coating layer is formed on the base substrate, and then a plasma process is performed thereon. According to Example 1, a surface of the base substrate is subjected to the surface treatment through the plasma process. According to Example 2, the first coating layer is formed similarly to Example 1, and then the plasma treatment process is additionally performed.

Comparative Example 1 showed break energy of about 0.59 J, Comparative Example 2 showed break energy of about 0.92 J, and Comparative Example 3 showed break energy of about 0.89 J. In contrast, Example 1 showed break energy of about 1.20 J, and Example 2 showed break energy of about 1.15 J.

Example 1 and Example 2 have excellent brake energy values as compared with Comparative Examples 1 to 3. Accordingly, it is seen that the coupling force between the base substrate and the first coating layer is improved to obtain the excellent impact resistance of the window when the plasma treatment process is performed on the surface of the base substrate before the first coating layer is formed.

TABLE 2

|  | Base substrate | After cleaning | After plasma treatment | After coating | After plasma treatment |
| --- | --- | --- | --- | --- | --- |
| Contact angle (DI) | 65° | 25° | 5° | 80° | 5° |

Table 2 shows contact angles of ultrapure water of the base substrate. It is seen that the base substrate which is not subjected to an additional surface treatment is the contact angle of 65°, and the base substrate having a surface which is cleaned is 25°. In contrast, the contact angle of ultrapure water after plasma treatment of one side of the base substrate is about 5° as in Example 1. The surface of the base substrate showed hydrophilicity through the plasma treatment process. Next, it is seen that the contact angle of the ultrapure water after the first coating layer is formed is 80°, and the contact angle when the coating layer is subjected to the plasma treatment is about 5°.

According to Table 2, the surface of the base substrate subjected to the hydrophilic treatment may have a strong coupling force with a solution forming the first coating layer. In addition, the solution forming the first coating layer may evenly spread on the base substrate.

Next, according to FIG. 12, Comparative Example 1 is a case where the base substrate has a thickness of 650 µm, and Example 1 is a case of including the base substrate and the first coating layer of Comparative Example 1. Comparative Example 2 is a case where the thickness of the base substrate is 750 µm, and Example 2 is a case of including the base substrate and the first coating layer of Comparative Example 2.

According to FIG. 12, it is seen that Comparative Example 1 shows break energy of about 0.59 J, and Example 1 shows break energy of about 1.2 J. It is seen that when the first coating layer is included, the break energy is increased by about two times.

It is seen that Comparative Example 2 shows the break energy of about 1.09 J, and Example 2 shows the break energy of about 1.63 J. In the case of Example 2, it is seen that the brake energy is increased as the first coating layer is included.

In addition, the increased break energy is 0.5 J when cases where the thickness of the base substrate is increased by 100 µm are compared as in Comparative Example 1 and Comparative Example 2. In contrast, when comparing it is seen that the break energy is increased by 0.6 J when the first coating layer having a thickness of 10 µm is further included. Since it is possible to provide greater impact resistance by including a coating layer of a thin thickness, the thickness and weight of the window may be reduced.

FIG. 13 is a graph illustrating results of ball drop tests for comparative examples and examples of FIG. 12. The ball tests are as described above, and steel balls were used in this experiment.

Referring to FIG. 13, a limit height is about 46.5 cm in Comparative Example 1 including a base substrate having break energy of 0.59 J. A limit height is about 94.4 cm in Example 1 where a first coating layer is added into Comparative Example 1. A limit height is about 85.6 cm in Comparative Example 2 including a base substrate having break energy of 1.09 J. A limit height is about 128.3 cm in Example 2 where a second coating layer is added to Comparative Example 2.

The limit height is about 40 cm when the thickness of the base substrate is increased by 100 µm as in Comparative Example 1 and Comparative Example 2. In contrast, referring to Comparative Example 1 and Example 1, it is seen that the limit height is increased by about 48 cm when the first coating layer has the thickness of 10 µm. It is seen that it is possible to provide greater impact resistance by using the coating layer of a thin thickness.

Referring to FIG. 14, heights of bright spot occurrence are checked for the comparative example including only the base substrate and the example including the base substrate and the first coating layer. A drop jig of 30 g is used to determine whether a bright spot occurred.

According to the comparative example, a maximum height at which the bright point occurs is about 30 cm, and a maximum height at which the bright point occurs according to the embodiment is about 36 cm. In addition, as a result of repeating multiple tests on the comparative examples and the examples, it is seen that the number of occurrences of bright points is 10 pieces, and that 6 pieces of the comparative example and 3 pieces of the examples are generated. It is therefore seen that the impact resistance is improved in the examples.

Referring to FIG. 15, the windows according to the comparative example and the example are combined with the model panel to measure the height at which the window breakage occurred due to the free fall. A display device in which the window is combined with the model panel is dropped from a height of 50 cm onto a granite substrate. It is seen that a crack of the window is generated from about 90 cm in the comparative example, and a crack of the window is generated from about 110 cm in the example. Accordingly, it is seen that the display device including the window according to the example has improved impact resistance and an excellent coupling force between the display panel and the window.

Referring to FIG. 16, whether a crack generated in the window according to the comparative and the example is checked.

The base substrate is broken and the crack is transferred to a whole part of the window in the comparative example including no first coating layer. This shows that an impact applied to a certain region of the window extends to a peripheral area.

In contrast, according to the example including the first coating layer, it is seen that, although a crack is generated at a certain region, the crack does not extend to a peripheral area. According to the example, it is seen that the impact absorption of the window is easy, thereby effectively suppressing the crack growth. As a result, according to the example, the window may suppress the amount and length of the crack itself because the impact is not transferred to the periphery even when some regions are broken.

Table 3 shows results of triaxial bending tests for the comparative example including the base substrate and the example including the base substrate and the first coating layer.

As shown in Table 3, it is seen that "Max force @ fracture" is increased from 553.10 N to 715.25 N, "Max flexural extension" is increased by about 1.3 times from 4.16 mm to 5.55 mm, "Flexural strength" is increased by about 1.3 times from 843.53 mPa to 1097.30 mPa, and "Elongation" is increased by 1.3 times from 1.14% to 1.52%.

TABLE 3

|  | Comparative Example | Example |
| --- | --- | --- |
| Max force @ fracture | 553.10N | 715.25N |
| Max flexural extension | 4.16 mm | 5.55 mm |
| Flexural strength | 843.53 mPa | 1097.30 mPa |
| Elongation | 1.14% | 1.52% |

Table 4 shows results of four-axial bending tests for the comparative example including the base substrate and the example including the base substrate and the first coating layer. As a result of the flexural modulus tests, it is seen that an average value (Avg) is increased by 1.4 times from 933.43 mPa to 1273.94 mPa, and a lower 10% value (B10) is increased by 1.6 times from about 665.36 mPa to 1060.18 mPa. In addition, it is seen that "Max force @ fracture" is increased from 961.87 N to 1312.76 N.

TABLE 4

|  |  | Comparative Example | Example |
| --- | --- | --- | --- |
| Flexural Modulus | B10 | 665.36 mPa | 1060.18 mPa |
|  | Avg | 933.43 mPa | 1273.94 mPa |
| Max force @ fracture |  | 961.87N | 1312.76N |

According to the above description, it is seen that the display device including the window according to the exemplary embodiments may improve the impact resistance of the window through the first coating layer covering the rear surface and the vertical surface of the base substrate to thereby reduce breakage of the window. In addition, even when a thin base substrate is included, it is possible to reduce the thickness and weight of the window itself by providing sufficient impact resistance. It is also possible to reduce the thickness and weight of a display device including such a window. Alternatively, it is possible to provide a display device having excellent performance by reducing the thickness of the window and increasing a thickness of a battery included in the display device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A window for a display device, comprising:
   a base substrate configured for use with the display device, the base substrate having a first surface configured to face toward a display panel, a second surface opposite the first surface and configured to face away from the display panel, and a side surface including a vertical surface disposed perpendicular to the first surface and the second surface;
   a first coating layer disposed directly on an entirety of the first surface of the base substrate; and
   a second coating layer different from the first coating layer and disposed directly on an entirety of the second surface,
   wherein:
   the first coating layer directly overlaps at least a portion of the vertical surface;
   an end surface of the first coating layer directly abuts an end surface of the second coating layer; and
   the end surfaces of the first and second coating layers are perpendicular to the vertical surface.

2. The window of claim 1, wherein the base substrate further comprises a first inclined surface that is inclined with respect to the first surface, and the first inclined surface connects the first surface and the vertical surface.

3. The window of claim 2, wherein the first coating layer directly overlaps the first inclined surface.

4. The window of claim 1, wherein an end of the first coating layer is inclined with respect to the base substrate.

5. The window of claim 1, wherein the base substrate further comprises a second inclined surface that is inclined with respect to the second surface, and
the second inclined surface connects the second surface and the vertical surface.

6. The window of claim 5, wherein the second inclined surface comprises a curved surface.

7. The window of claim 5, wherein the second coating layer overlaps the second inclined surface.

8. A window for a display device, comprising:
a base substrate configured for use with the display device, the base substrate having a first surface configured to face toward a display panel, a second surface opposite the first surface and configured to face away from the display panel, and a vertical surface disposed perpendicular to the first surface and the second surface;
a first coating layer disposed on the first surface of the base substrate; and
a second coating layer disposed on the second surface,
wherein the first coating layer overlaps at least a portion of the vertical surface, and
wherein the first coating layer comprises methyl T polydimethylsiloxane.

9. The window of claim 8, wherein the first coating layer further comprises at least one of octamethylcyclotetrasiloxane and dimethylsiloxane.

10. The window of claim 8, wherein the first coating layer further comprises a melamine resin.

11. The window of claim 1, wherein a thickness of the first coating layer is in a range of 7 μm to 13 μm.

12. The window of claim 1, wherein the base substrate and the first coating layer are covalently bonded to each other.

13. A display device, comprising:
a display panel; and
a window configured to cover the display panel,
wherein the window comprises:
a base substrate having a first surface facing the display panel, a second surface opposite the first surface and facing away from the display panel, and a side surface including a vertical surface perpendicular to the first surface and the second surface;
a first coating layer disposed directly on an entirety of the first surface of the base substrate; and
a second coating layer different from the first coating layer and disposed directly on an entirety of the second surface of the base substrate,
wherein:
the first coating layer directly overlaps the vertical surface;
an end surface of the first coating layer directly abuts an end surface of the second coating layer; and
the end surfaces of the first and second coating layers are perpendicular to the vertical surface.

14. The display device of claim 13, wherein the display panel is flexible.

15. The display device of claim 13, wherein the base substrate further comprises a first inclined surface that is inclined with respect to the first surface,
the first inclined surface contacts the first surface and the vertical surface, and
the first coating layer directly overlaps the first inclined surface.

16. The display device of claim 13, wherein the base substrate further comprises a second inclined surface that is inclined with respect to the second surface,
the second inclined surface connects the second surface and the vertical surface, and
the second coating layer overlaps the second inclined surface.

17. The display device of claim 13, wherein a first surface of the base substrate comprises a groove, and the first coating layer fills the groove.

18. The display device of claim 13, further comprising
an adhesive layer and a light blocking layer disposed between the first coating layer and the display panel.

19. A window for a display device, comprising:
a base substrate comprising a first surface and a second surface opposite the first surface; and
a first coating layer disposed directly on a first surface of the base substrate and configured for securing the base substrate to the display device,
wherein the base substrate further comprises a vertical surface perpendicular to the first surface and the second surface, and the first coating layer directly overlaps the vertical surface, and
wherein the first coating layer comprises methyl T polydimethylsiloxane.

20. The window of claim 19, further comprising
a second coating layer disposed on the second surface of the base substrate.

21. The window of claim 19, wherein the base substrate further comprises a first inclined surface inclined with respect to the first surface,
the first inclined surface connects the first surface and the vertical surface, and
the first coating layer directly overlaps the first inclined surface.

22. The window of claim 19, wherein the base substrate further comprises a second inclined surface inclined with respect to the second surface,
the second inclined surface connects the second surface and the vertical surface,
the second coating layer overlaps the second inclined surface.

* * * * *